United States Patent

[11] 3,573,546

| [72] | Inventor | Charles S. Hemery<br>La Celle Saint-Cloud, France |
|---|---|---|
| [21] | Appl. No. | 660,638 |
| [22] | Filed | Aug. 15, 1967 |
| [45] | Patented | Apr. 6, 1971 |
| [73] | Assignee | Societe Anonyme Des Anciens<br>Establissements Charles Berthiez<br>Paris, France |

[54] TEMPLATE COPYING APPARATUS
9 Claims, 7 Drawing Figs.

[52] U.S. Cl.................................................. 318/578,
  318/657
[51] Int. Cl..................................................G05b 19/36
[50] Field of Search........................................... 318/8—33

[56] References Cited
UNITED STATES PATENTS

| 1,998,939 | 4/1935 | Mittag............................ | 318/162X |
| 2,887,639 | 5/1959 | Dutcher........................ | 318/162X |
| 3,022,663 | 2/1962 | Diddens........................ | 318/28X |
| RE25,648 | 9/1964 | Herndon....................... | 318/28 |
| 3,259,820 | 7/1966 | Jones............................ | 318/28 |

Primary Examiner—Benjamin Dobeck
Attorney—John J. Hart

ABSTRACT: The invention relates to machining a workpiece, copying a template in two dimensions. The template is sensed by a copy head assembly, the assembly comprising a copy head moving with the tool, and a template follower movably mounted in the copy head. Deviation of the follower within the copy head in any direction produces a signal voltage, proportional to the magnitude of the deviation, which is compared with a series of reference voltages. The magnitude of the deviation, regardless of the direction, as determined by the voltage comparison, determines the direction of movement of the copy head and the tool.

TEMPLATE COPYING APPARATUS

The present invention relates to template copying apparatus, more particularly but not necessarily solely for machining a workpiece.

A machining technique known as "two-dimensional copying" consists in reproducing the shape of a template on a workpiece. The feeler of a copy head follows the template, the copy head usually being secured to the machine part which bears the tool whereas the template is rigidly secured to the frame and physically stationary.

Through the agency of two crossed slides, the tool and the feeler can follow any flat curve; in the particular case of this invention the movement of each slider is derived from a drive box via a reversing mechanism comprising two electromagnetic clutches, one for each direction.

In other cases in which the invention is also of use, each slide is moved by a reversible hydraulic or electric motor. Consequently, a parallel or vertical lathe has four electromagnetic clutches enabling the tool to move inwards towards the axis of spindle rotation, outwards away from such axis and, (in a direction perpendicular to these first two directions,) towards and away from the mandrel or faceplate.

The feeler head contains a mechanism which opens or closes electric contacts in dependence upon the absolute amount of feeler deviation and independently of the direction of such deviation. These contacts make or break the energization of the electromagnetic clutches in a predetermined sequence such that the direction of tool movement is varied consecutively either clockwise or anticlockwise from an initial direction so that the feeler stays in contact with the template. This order of succession of movements and the initial direction of approach to the template can be selected by a selector switch in accordance with working requirements.

The use of electric contacts in a copy head has various disadvantages. The contacts oxidize or wear even though currents are very low, are sensitive to vibrations, and are difficult to adjust, yet should be rapidly adjustable to suit the required accuracy, for the less the difference between feeler deviations producing a movement of the tool in one direction and in the opposite direction, the less are the errors arising from such deviation and the greater is accuracy. However, there is always an irreducible response time between the transmission of a signal by the copy head and the clutching or declutching of a movement. When the distance travelled by the tool in the response time is greater than or equal to the deviation difference producing reversal, the system is unstable and may hunt. Adjusting contact gaps to a predetermined value therefore has the result of limiting the possible rate of working and the possible accuracy. It is therefore useful to be able to adjust the value of the deviations readily in dependence upon the rate of work (advance) and upon the accuracy which are required.

According to the invention, there is provided a template copying apparatus, comprising a controllably movable copy head, a follower mounted in the copy head to follow the form of a template, deviation demodulator means to produce a continuously variable electrical signal output dependent upon deviation of the follower from a given relative datum position in the copy head, means to produce a series of reference electrical outputs of different values, means to compare the reference outputs with the variable signal output and to select the reference output corresponding to a particular signal output and control means to produce a predetermined movement of the copy head corresponding to the selected reference output.

A preferred template copying apparatus in accordance with the invention comprises:

a continuously operating deviation demodulator which is controlled by the follower and which delivers a continuously varying signal voltage, called the "actual voltage";

a stabilized-voltage generator supplying a voltage divider delivering a series of constant reference voltages, and electronic comparator circuits for comparing the actual voltage with the reference voltages, each such circuit being connected to the deviation demodulator and to at least one output of the voltage divider, the active element of the particular arrangement concerned also being interposed possibly via a relay, between a power source and an electrical control element of means to drive the copy head in a corresponding direction.

In other words, the contacts of the known intermittently operating head are replaced by a continuously operating electrical device (such as an inductive transducer) which gives an output voltage proportional to follower deviation. The latter voltage is compared with predetermined reference voltages and, whenever the follower deviation voltage becomes equal to any reference voltage, the device acts on a corresponding clutch to either energize or deenergize the same.

In one embodiment of the invention, the apparatus comprises a six-output voltage divider and four electronic voltage comparator circuits cooperating with an appropriate switching logic.

Preferably, the continuously operating deviation demodulator takes the form of a differentially wound inductive transducer, of which the magnetic core is connected to the moving system of the feeler and of which the windings are connected the one to the stabilized voltage supply (via a transistorised converter producing an a.c. of appropriate frequency) and the other between the stabilized-voltage generator and the input of the electronic comparative circuit arrangements (via a multidiode detector).

An amplifier is preferably interposed between the output of the deviation demodulator comparator and the input of each of the electronic voltage comparator circuit arrangements.

Preferably, the electronic voltage comparator circuits take the form in known manner of electronic bistable circuits, the input of each comparator circuit being connected to the output of the amplifier and to at least one output of the voltage divider, the operative element of each of the comparator circuits being a relay-transistor combination which becomes conductive when the follower signal voltage reaches the level of the reference voltage corresponding to the particular comparator circuit concerned, this pilot relay acting, through the agency of the aforesaid power supply, on a power relay controlling the corresponding electromagnetic clutch.

The apparatus may also comprise:

a sensitivity adjustment means which can be more particularly a potentiometer for adjusting amplifier gain;

a zero adjustment facility which can comprise, on the one part, a micrometer element for adjusting the core position in the differentially wound inductive transducer and, on the other part, a potentiometer interposed between the stabilized-voltage generator and such transducer, and an interlock which can take the form of either a fifth electronic voltage comparator circuit connected to the deviation demodulator comparator and to a seventh output of the voltage divider, the operative element of such fifth circuit arrangement cooperating with a relay for deenergizing all the clutches, or of a microcontact operated mechanically by the feeler.

Consequently, the discrete steps which take the place of the contacts of the conventional electromagnetic copying apparatus are determined by the change-of-state thresholds of the electronic bistable circuits, of which the respective circuits compare the voltage delivered by the continuously operating deviation demodulator with the regularly graded reference voltages delivered by the voltage divider. At each threshold thus produced a switching operation is performed which consecutively energizes and deenergizes one of the electromagnetic clutches for selecting directions of movement, in the same order as in the conventional electromagnetic copying facility.

As a secondary feature, such an apparatus, enabling as it does the system formed by the inductive transducer and the bistable circuits, (with a potentiometer for adjusting the amplifier gain) to be supplied at an adjustable voltage, makes it possible to vary the sensitivity of the latter system but without altering its fundamental characteristics, more particularly a constant ratio of deviations to response times.

Another advantage provided by such an apparatus is the obviation of contacts and their replacement by static electronic elements disposed outside the actual copy head. This feature obviates the familiar disadvantages of followers operating contacts, namely oxidation and pitting of the contacts, hence unstable adjustment, difficulties in adjusting contact gaps to vary sensitivity, fragility and reduced viability in general. Such an apparatus also helps to obviate the difficulties found in conventional electromagnetic copying due to instability of the negative feedback circuit (hunting), when endeavors are made to increase the sensitivity or the speed of travel.

The invention will be described by way of example with reference to the accompanying drawings, in which.

Figure 7:
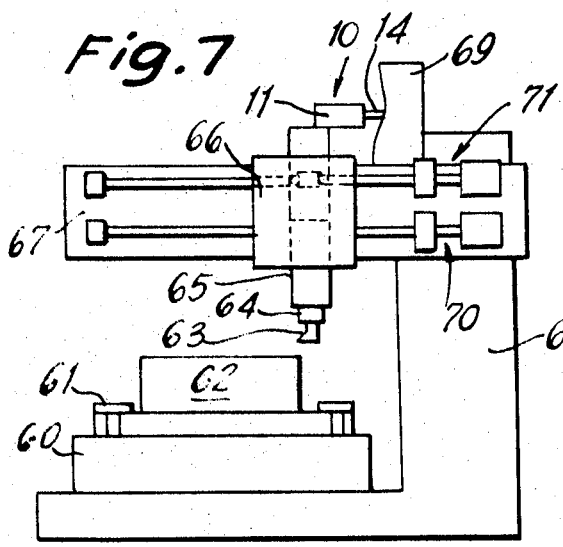

FIG. 7 of the drawings shows generally a machine tool of the type to which the present invention relates. Such a machine usually comprises a support table 60 having suitable means 61 for securing a workpiece 62 thereto. The tool 63 to be used on the workpiece is secured in a holder 64 provided at the lower end of a vertically movable member 65 mounted in a carriage 66 horizontally slidable on a horizontal member 67 secured at one end to a vertical column 68. As previously indicated the tool 63 reproduces the shape of a template 69 on the workpiece through a copy head 10. The copy head 10 is secured to the carriage 66 and the template 69 is mounted on the horizontal member 67. The tool is enabled to follow the template by means of electromagnetic clutch reversing mechanism which is generally designated 70 in FIG. 7 and which controls the horizontal movements of the carriage 66 and by means of electromagnetic clutch reversing mechanism which is generally designated 71 and which controls the vertical movements of the vertical slide member 65.

Figure 1:
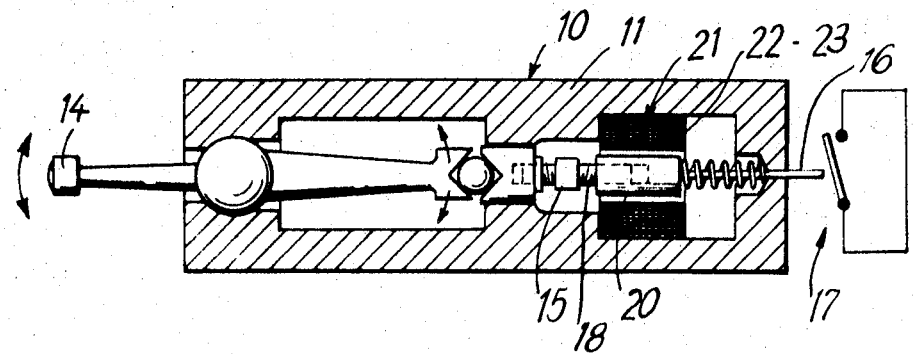
FIG. 1 is a diagrammatic section through a copy head of a template copying apparatus in accordance with the invention, for controlling slide movement of a vertical lathe (not shown) through electromagnetic clutches (not shown)

As is shown more clearly in FIG. 1 of the drawings, the copy head or feeler head 10 comprises, projecting from a casing 11, a follower or feeler 14 adapted to cooperate with a copy template 69 when brought into contact therewith. Through the agency of an appropriate known mechanical transmission, deviation of the feeler 14 in any direction is converted into an axial movement of a left- and right-hand threaded rod 18 guided translationally in casing 11, such displacement being proportional to the amplitude of the deviation. A magnetic core 20 of an inductive transducer 21 is screwed on and rigidly connected to rod 18 and therefore moves proportionally to the deviation in relation to stationary differential windings, 22, 23 of the transducer. The mechanical transmission shown in FIG. 1 represents by way of example a conventional swivel system in which deviations of the feeler from its axial equilibrium position are converted, in dependence upon their amplitude and radial direction, into longitudinal movement of rod 18 which bears the operative element of a deviation demodulator i.e., the magnetic core of the inductive transducer in the device according to this invention. Of course, any other equivalent mechanical transmission, e.g. plate or diaphragm, can be used.

Figure 2:
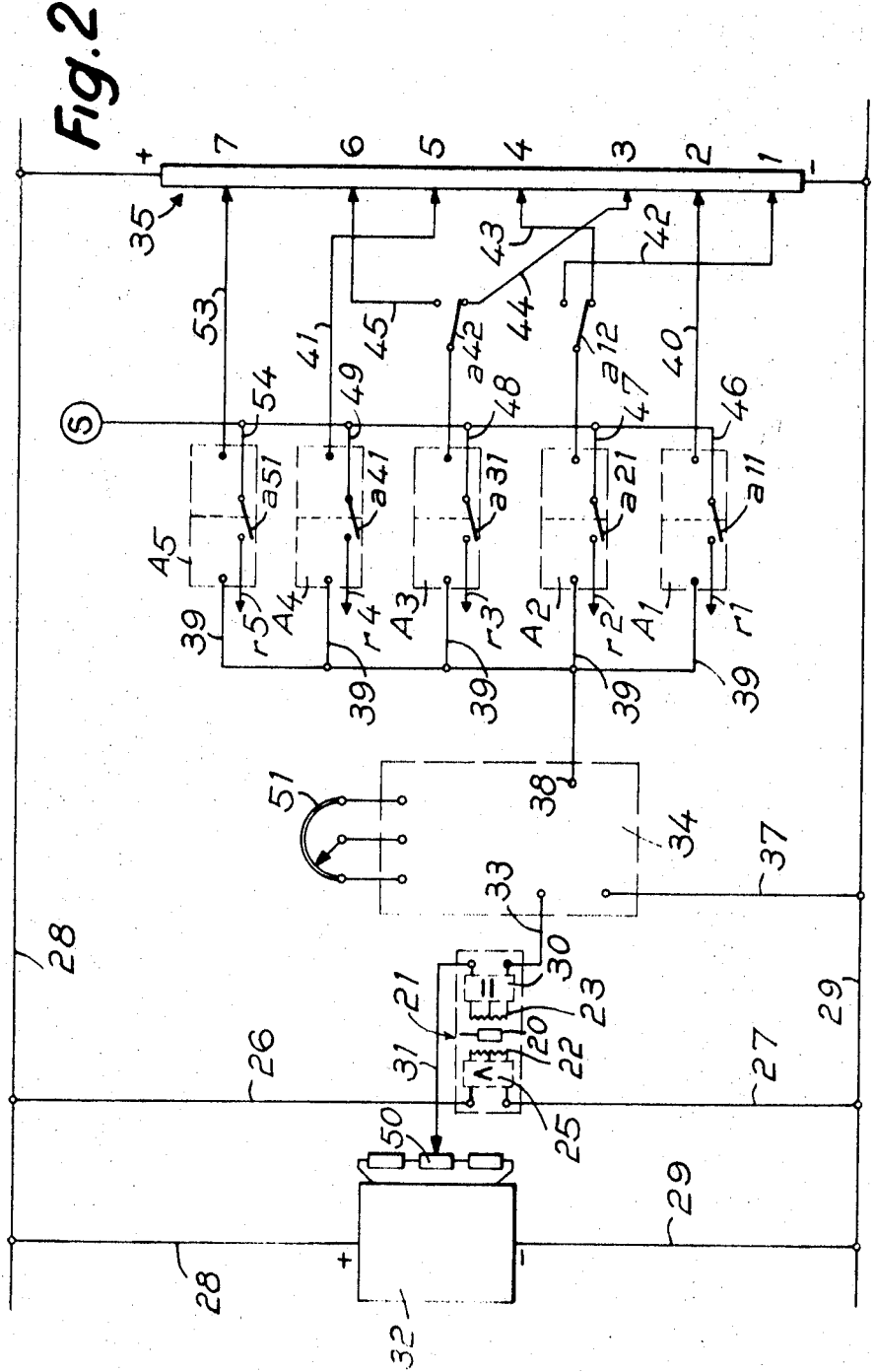
FIG. 2 is a circuit diagram of the apparatus.
Figure 4:
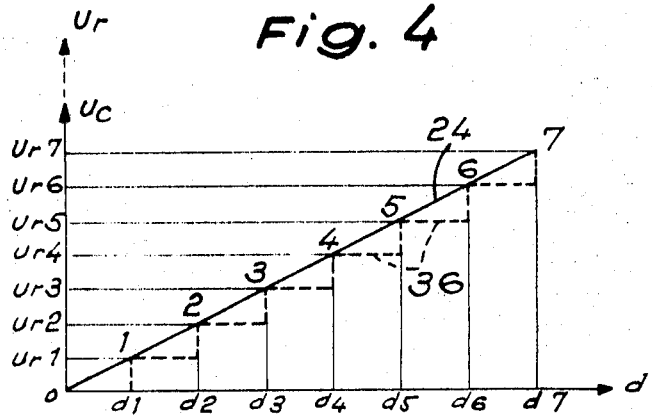
FIG. 4 is a graph in which a continuously varying voltage $U_c$ delivered by an inductive transducer of the copy head and constant reference voltages $U_{r1}$—$U_{r7}$ delivered by a voltage divider are plotted as ordinates against feeler deviation $d$ plotted as abscissae, of which thresholds are graded in arithmetical progression from $d_o$ to $d_7$.

In the embodiment shown in FIGS. 1 and 2, the inductive transducer 21 delivers a voltage $u_c$ which varies linearly and continuously in dependence upon feeler deviation $d$; the variation is represented by a straight line 24 in the graph in FIG. 4. As FIG. 2 shows, the transducer winding 22 can be connected up in a transistorised converter circuit 25, of which the terminals are connected by conductors 26, 27 to two conductors 28, 29 of a network supplied by a stabilized-voltage generator 32, whereas winding 23 is connected to a multidiode demodulator circuit 30, one terminal of which is connected by a conductor 33 to a measuring amplifier 34. The continuously operating deviation demodulator can be of some other kind than the inductive transducer 21 hereinbefore outlined and can be e.g. a potentiometric comparator.

The conductors 28, 29 are connected to the generator 32 to supply, for example, resistance type voltage divider 35. In the embodiment shown in FIG. 2, the divider 35 has six outputs 1, 6 supplying six substantially constant regularly graded reference voltages $U_{r1}$ to $U_{r6}$ which provide comparison steps represented by a staircase 36 in FIG. 4. As will be described hereinafter, a seventh output 7 can be used for an interlock.

The deviation demodulator operates in combination with amplifier 34 whose input is connected to the transducer 21 and via a conductor 37 to the supply line 29. The amplifier 34 therefore delivers at an output 38 a voltage $U_c$ which is proportional to the voltage $U_c$ delivered by the transducer 21, the multiplication factor corresponding to the amplifier gain.

It is therefore required to compare the amplifier output voltage $U_c$ with the voltage steps $U_{r1}$ to $U_{r6}$, so that through the agency of a switching logic to be described hereinafter, electromagnetic clutches $E_1$ to $E_4$ can be energized (to move the tool e.g. in the direction indicated by arrows $F_1$ to $F_4$ in FIG. 5) in dependence upon the data supplied by the feeler 14—i.e., by the transducer 21—and thus to ensure that the resulting movement of the tool corresponds with the shape of the template.

To this end, the copying device according to FIG. 2 comprises four electronic voltage comparator circuit arrangements $A_1$ to $A_4$ associated with a switching logic. Such arrangements, which are formed by electronic bistable circuits or any other equivalent means, are each shown diagrammatically in the drawings as a rectangle; only their respective inputs and the contacts of the pilot relays of the transistor-relay combinations forming their respective operative elements are shown. As will be seen hereinafter, a fifth such arrangement $A_5$ can be used for the interlock.

One input of each arrangement $A_1$ to $A_4$ is connected by a conductor 39 to output 38 (voltage $U_c$) of amplifier 34. Also, as can be seen in FIG. 2, the other input of arrangement $A_1$ is connected by a conductor 40 to output 2 of voltage divider 35; similarly the other output of arrangement $A_4$ is connected by a conductor 41 to output 5 of voltage divider 35.

On the other hand, the other input of arrangement $A_2$ is connected by conductors 42, 43 to outputs 1, 4 of divider 35, but selectively through the agency of a selector switching element $a_{12}$, such as a transistor, controlled by the first arrangement $A_1$. The element $a_{12}$, upon becoming conductive ($e_1$ state of the arrangement $A_1$), switches arrangement $A_2$ to output 1 of divider 35, and when nonconductive ($e_0$ state of arrangement $A_1$) connects arrangement $A_2$ to voltage divider output 4.

Similarly, the other input of arrangement $A_3$ is connected by conductors 44, 45 to outputs 3, 6 of divider 35 but selectively through the agency of a selective switching element $a_{42}$, such as a transistor, controlled by the fourth arrangement $A_4$. The element $a_{42}$, upon becoming conductive $e_1$ state of arrangement $A_4$), switches arrangement $A_3$ to output 6 of voltage divider 35 and when nonconductive $e_0$ state of arrangement $A_4$) switches arrangement $A_3$ to voltage divider output 3.

Also, the operative elements $a_{11}$ to $a_{41}$ of arrangements $A_1$ to $A_4$ are connected in series with conductors 46—49 connecting a power supply S to relays $r_1$ to $r_4$ which, through the agency of appropriate switching leading to power relays, can energize the electromagnetic clutches $E_1$ to $E_4$, respectively.

Figure 5:
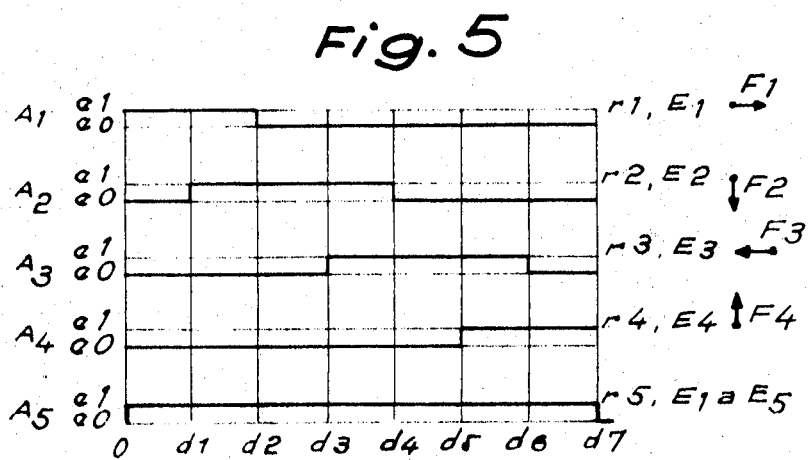
FIG. 5 is a diagram showing states $e_0$ and $e_1$ of electronic bistable circuits in dependence upon follower or feeler deviation $d$ and also showing tool movements produced by electromagnetic clutches $E_1$ to $E_4$ and via relays $r_1$ to $r_4$ when their respective bistable circuits $A_1$ to $A_4$ alone are in the $e_1$ state.

From the foregoing and referring now to FIGS. 4 and 5, therefore, with regard to arrangement $A_1$, when the actual or measured voltage $U_c$ (output from the transducer 21, $r_1$. amplified by the amplifier 34) is between zero and the reference voltage $U_{r2}$, arrangement $A_1$ is in the $e_1$ state; its operative element $a_{11}$ is conductive and connects power supply S to relay $r_1$ which caUses clutch $E_1$ to be energized, so that the tool tends to move in the direction indicated by the arrow $F_1$. When voltage $U_c$ becomes equal to reference voltage $U_{r2}$, arrangement $A_1$ flip-flops into the $e_0$ state until beyond the reference voltage $U_{r6}$, its operative element $a_{11}$ ceases to be conductive, and so relay $r_1$ ceases to be energized, clutch $e_1$ is deenergized and the tool ceases to move in the direction indicated by arrow $F_1$.

With regard to the arrangement $A_2$, when voltage $U_c$ is below the reference voltage $U_{r1}$, the arrangement $A_2$ is in the $e_0$ state, its operative element $a_{21}$ is not conductive and the relay $r_2$ is not energized. When voltage $U_c$ becomes equal to voltage $U_{r1}$, arrangement $A_2$ flip-flops into the $e_1$ state, since the switching element $a_{12}$ (the arrangement $A_1$ being in the $e_1$ state) connects arrangement $A_2$ to voltage divider output 1. Operative element $a_{21}$ of arrangement $A_2$ then becomes conductive and connects power supply S to relay $r_2$ which energizes clutch $E_2$, so that the tool tends to move in the direction indicated by arrow $F_2$. Clutch $E_2$ stays energized until voltage $U_c$ becomes equal to the reference voltage $U_{r4}$. Upon the voltage $U_c$ becoming equal to the reference voltage $U_{r4}$, arrangement $A_2$ flip-flops back into the $e_0$ state until beyond the reference voltage $U_{r6}$, since the switching element $a_{12}$ connected arrangement $A_2$ to voltage divider output 4 when the reference voltage $U_{r2}$ was passed through, for at that time the arrangement $A_1$ flip-flopped into the $e_0$ state. Consequently, when the voltage $U_c$ becomes equal to the voltage $U_{r4}$, the arrangement $A_2$ returns to the $e_0$ state and the electromagnetic clutch is deenergized, so that the tool ceases to move in the direction indicated by the arrow $F_2$.

With regard to the arrangement $A_3$, a first changeover occurs when the voltage $U_c$ becomes equal to the reference voltage $U_{r3}$, the changeover being from the $e_0$ state to the $e_1$ state (since, due to the arrangement $A_4$ being in the $e_0$ state the switching element $a_{42}$ connects the arrangement $A_3$ to voltage divider output 3). With effect from the voltage $U_{r3}$ the operative element $a_{31}$ becomes conductive and connects power supply S to relay $r_3$ which produces energization of clutch $E_3$ so that the tool tends to move in the direction indicated by the arrow $F_3$. The arrangement $A_3$ changes back when the voltage $U_c$ becomes equal to the reference voltage $U_{r6}$, changing over from the $e_1$ state to the $e_0$ state, (since the element $a_{42}$ switched the arrangement $A_3$ to voltage divider output 6 when the voltage $U_c$ became equal to the reference voltage $U_{r5}$ and the arrangement changed over from the $e_0$ state to the $e_1$ state). With effect from the voltage $U_{r6}$ the operative element $a_{31}$ ceases to be conductive and the clutch $E_3$ ceases to be energized; the tool therefore ceases to move in the direction indicated by the arrow $F_3$, as is also the case when the voltage $U_c$ is less than the reference voltage $U_{r3}$ since the bistable $A_3$ is in the $e_0$ state.

With regard to the arrangement $A_4$, the same is in the $e_0$ state provided that the voltage $U_c$ is between zero and $U_{r5}$; arrangement $A_4$ flip-flops into the $e_1$ state when the voltage $U_c$ becomes equal to the reference voltage $U_{r5}$. In other words, below the reference voltage $U_{r5}$ the tool cannot be moved in the direction indicated by the arrow $F_4$, but it is moved above such voltage, since the operative element $a_{41}$ becomes conductive and connects power supply S to relay $r_4$ to energize the clutch $E_4$.

Figure 6:
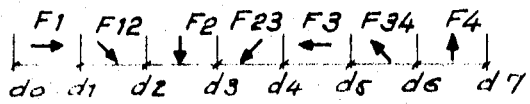
FIG. 6 is a diagram showing the tool movement obtained as each of the thresholds 0 to 7 are passed through, and FIG. 7 is a diagrammatic side elevational view of a machine tool embodying the invention.

It is therefore clear from the foregoing and from a comparison of FIGS. 4—6, that when the actual voltage $U_c$ delivered by the sensor is between:

Zero and $U_{r1}$, the tool moves in the direction of the arrow $F_1$;
$U_{r1}$ and $U_{r2}$, the tool moves in the direction of the arrow $F_{12}$;
$U_{r2}$ and $U_{r3}$, the tool moves in the direction of the arrow $F_2$;
$U_{r3}$ and $U_{r4}$, the tool moves in the direction of the arrow $F_{23}$;
$U_{r4}$ and $U_{r5}$, the tool moves in the direction of the arrow $F_3$;
$U_{r5}$ and $U_{r6}$, the tool moves in the direction of the arrow $F_{34}$;
$U_{r6}$ and $U_{r7}$, or due to the operation of the interlock (however it may operate), the tool moves in the direction of arrow $F_4$.

An important point is that the comparison circuit arrangements $A_1$ to $A_4$ are not limited to the embodiment (using bistables) hereinbefore described by way of example, nor is there any limitation on the switching logic. Also, at the level of the relay-controlling switching the operator can select, in dependence upon the required travel, allotment of the signals of the four arrangements $A_1$ to $A_4$ to the various relays $r_1$ to $r_f$.controlling the four direction clutches $E_1$ to $E_4$ and their sequential direction.

The copying apparatus also comprises a zero adjustment facility, for the "normal" position of the feeler 14 (zero deviation $d$ equals 0) must exactly correspond to zero variable voltage $U_c$, which must start to increase linearly immediately the feeler contacts the template to produce the start of the deviations $d$. If this coincidence is not made strictly accurate, some of the operative travel of the sensor core 20 is wasted; also, when system sensitivity is altered the system does not react "faithfully"—i.e., the value of the first deviation does not remain proportional to the others when sensitivity is altered.

The zero adjustment means comprises a mechanical element (not shown in FIG. 2) for bringing the feeler 14 substantially onto the electrical axis of the head 10; in practice, micrometer adjustment of the position of core 20 in sensor 21 by turning the threaded rod 18 through manual manipulation of the finger piece 15 provided centrally thereon, as is shown in FIG. 1, is completely satisfactory, and, second, a potentiometer 50 (FIG. 2) interposed between the stabilized-voltage generator 32 and a conductor 31 extending to the detector circuit 30 of sensor 21; through the agency of potentiometer 50, a constant but adjustable voltage can be added algebraically to the sensor output voltage $u_c$.

It is a simple job with this zero adjustment facility to make the mechanical zero feeler 14 coincide with the electrical zero of the sensor 21.

The copying apparatus also comprises a sensitivity adjustment means. The voltage available directly from the deviation detector winding is too small to be used directly for comparison with the voltage scale $U_{r1}$ to $U_{r6}$ and must therefore be amplified. The amplifier 34 used for this purpose restores an output voltage $U_c$ proportional to the input voltage—i.e., the output voltage $U_c$ of the sensor 21—the ratio between the voltage is $U_c$ and $u_c$ being the amplifier gain. The sensitivity of the apparatus is dependent upon the relationship between amplifier output voltage variation and the deviation—i.e., the rectilinear movement of the core 20 in its winding. This sensitivity can therefore be adjusted by acting on the amplifier gain. To this end, the sensitivity adjustment facility comprises a potentiometer 51 (FIG. 2) which provides continuous adjustment of the gain of the amplifier 34 over a range of something like e.g. 1 to 15, a variation sufficient for ample coverage of practical conditions.

Figure 3:
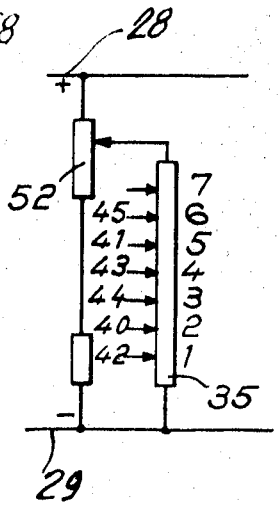
FIG. 3 is a partial circuit diagram, which should be substituted for part of the circuit diagram shown in FIG. 2, showing an alternative form of sensitivity adjustment means.

In a variant shown in FIG. 3, sensitivity can be adjusted by proportional alteration of the reference voltages $U_{r1}$ to $U_{r6}$ by using a potentiometer 52 to vary the voltage divider input voltage. In this case, the range of variation of this input voltage can be limited, for instance, to 1—4, the potentiometer then cooperating with a simplified amplifier which provides only two fixed-value gains which can be selected manually and which are in a ratio of 1:4 to one another.

As has also been seen, the copying apparatus can be used to follow a template having an angular opening of up to 270°—i.e., it can be used to supervise the reactions of the template on the feeler head 10 by a sequence of movements forming an angle of up to 270° with the initial direction of template approach. Were the sequence of movements along the profile to exceed this 270° limit, the deviation $d$ would increase beyond the value corresponding to the top reference voltage step $U_{r6}$ of the reference voltage scale and there would be no negative feedback and the machine would cease to be controlled by the copying apparatus.

To obviate any such incident, when deviation reaches the threshold corresponding to 270°, an interlock operates and immediately deenergizes the directional clutches and therefore stops the tool at the position which it has reached.

The first form of such an interlock can comprise a microcontact which is operated mechanically by the feeler 14 when the same reaches a preset deviation. This form of interlock is shown in FIG. 1 of the drawings and comprises a rod 16 mounted on and projecting from the outer end of the core 20 and through the adjacent end of the casing 11 to a position enabling it to actuate the safety microswitch designated generally 17. A second form of interlock can comprise a fifth voltage comparator circuit arrangement $A_5$ (FIGS. 2 and 4—6) similar to the arrangements $A_1$ and $A_4$. As in the arrangements $A_1$ and $A_4$, one input of the arrangement $A_5$ is connected by a conductor 39 to output 38 (voltage $U_c$) of amplifier 34, the other input being connected via a conductor 53 to voltage divider output 7. Operative element $A_{51}$ of arrangement $A_5$ is connected in series with a conductor 54 connecting power supply S to a relay $r_5$ for simultaneously deenergizing all four clutches $E_1$ to $E_4$. In other words, provided that the detected and amplified voltage $U_c$ is less than the reference voltage $U_{r7}$, the element $a_{51}$ stays conductive and the arrangements $A_1$ to $A_4$ operate normally. When the voltage $U_c$ becomes equal to the voltage $U_{r7}$, the arrangement $A_5$ flip-flops and the element $a_{51}$ becomes nonconductive and interrupts the power supply S which normally supplies the power relay $r_5$, so that the clutches $E_1$ to $E_4$ are all deenergized and the tool therefore stops, whatever the state of the arrangements $A_1$ to $A_4$.

The invention is not limited to the embodiment shown and described in detail, since various modifications can be made without departure from the scope of the invention as defined in the appended claims.

I claim:

1. In an apparatus for machining a workpiece by means of a tool under the control of a copy head sensing the form of a template, the apparatus comprising means for mounting the workpiece and the tool, means for producing relative machining movement between them in a controllably selected direction, means for mounting the template and the copy head and means for producing relative movement between the template and the copy head to correspond with the relative motion of the workpiece and the tool, the provision of:
   a follower mounted in the copy head to follow the form of the template;
   deviation demodulator means composed of a differentially wound inductive device to produce a continuously variable electrical signal output dependent upon deviation of the follower from a given relative datum position in the copy head;
   means to produce a series of reference electrical outputs of different values;
   means to compare the reference outputs with the variable signal output and to select the reference output corresponding to a particular signal output;
   control means to produce a predetermined movement of the copy head corresponding to the selected reference output; and means to furnish a stabilized DC voltage supply, said inductive device being formed by:
   a magnetic core movable by the follower;
   one winding connected to the stabilized DC voltage supply via a converter, and
   another, differentially wound, winding between the stabilized voltage supply and the comparison means.

2. In an apparatus for machining a workpiece by means of a tool under the control of a copy head sensing the form of a template, the apparatus comprising means for mounting the workpiece and the tool, means for producing relative machining movement between them in a controllably selected direction, means for mounting the template and the copy head and means for producing relative movement between the template and the copy head to correspond with the relative motion of the workpiece and the tool, the provision of:
   a follower mounted in the copy head to follow the form of the template;
   deviation demodulator means to produce a continuously variable electrical signal output dependent upon deviation of the follower from a given relative datum position in the copy head;
   means to produce a series of reference electrical outputs of different values;
   means to compare the reference outputs with the variable signal output and to select the reference output corresponding to a particular signal output, and
   control means to produce a predetermined movement of the copy head corresponding to the selected reference output, said comparison means comprising a plurality of comparator circuits each having two inputs formed by the electrical signal and a corresponding electrical reference, each comparator circuit being arranged to adopt one state or the other according to whether the electrical signal is greater or less respectively than the reference.

3. An apparatus according to claim 2, wherein one of the comparator circuits is operative to switch an input of another of the comparator circuits from one electrical reference to another.

4. An apparatus according to claim 2, wherein the deviation demodulator means is adapted to produce the electrical signal in the form of a voltage which increases with increase in deviation;
   the electrical reference producing means is adapted to produce the electrical references in the form of reference voltages, and
   the comparison means is adapted to select the reference voltage immediately below the signal voltage.

5. An apparatus according to claim 4, wherein:
   the electrical reference producing means is adapted to produce six electrical reference voltages;
   the comparison means comprises four comparator circuits;
   a first one of the comparator circuits is connected to the second reference voltage in ascending order of magnitude;
   a second comparator circuit is connected selectively to the first or fourth reference voltage under the control of the first comparator circuit, according to whether the signal voltage is lower or higher respectively than the second reference voltage;
   the third comparator circuit is connected selectively to the third or sixth reference voltage under the control of the fourth comparator circuit, which is connected to the fifth reference voltage, according to whether the signal voltage is lower or higher respectively than the fifth reference voltage, and
   the four comparator circuits controlling movement in a first direction, a perpendicular second direction, a third direction opposite to the first and a fourth direction opposite to the second, respectively.

6. Apparatus according to claim 4, wherein a zero adjustment means enables the making of contact between the follower and the template to coincide with the start of the growth of the signal voltage output from the deviation detector means.

7. Apparatus according to claim 6, provided with means to furnish a stabilized DC voltage supply, wherein the inductive device is formed by:
   a magnetic core movable by the follower;
   one winding connected to the stabilized DC voltage supply via a converter, and another, differentially wound, winding between the stabilized voltage supply and the comparison means, wherein the zero adjustment means comprises a micrometer element for adjusting core position in the differentially wound inductive device, and a potentiometer interposed between the stabilized voltage supply and the inductive device.

8. Apparatus according to claim 5, wherein an interlock is arranged to interrupt movement of the copy head when the deviation of the follower rises above a predetermined limit, the interlock being in the form of a fifth voltage comparator circuit connected to the variable signal voltage and to a seventh reference voltage, said fifth comparator circuit controlling a relay for interrupting copy head movement.

9. In an apparatus for machining a workpiece by means of a tool under the control of a copy head sensing the form of a template, the apparatus comprising means for mounting the workpiece and the tool, means for producing relative machining movement between them in a controllably selected direction, means for mounting the template and the copy head and means for producing relative movement between the template and the copy head to correspond with the relative motion of the workpiece and the tool, the provision of:

a follower mounted in the copy head to follow the form of the template;

deviation demodulator means to produce a continuously variable electrical signal output dependent upon deviation of the follower from a given relative datum position in the copy head;

means to produce a series of reference electrical outputs of different values;

means to compare the reference outputs with the variable signal output and to select the reference output corresponding to a particular signal output, control means to produce a predetermined movement of the copy head corresponding to the selected reference output, and means to adjust sensitivity to follower deviation, said sensitivity adjustment means being operative to adjust the value of a voltage divider producing the electrical references as voltages and comprising, in combination, a potentiometer for adjusting the voltage divider input voltage and an amplifier providing the variable electrical signal with only two fixed and manually selectable gains.

PO-1050
(5/69)

UNITED STATES PATENT OFFICE
CERTIFICATE OF CORRECTION

Patent No. 3,573,546                Dated April 6, 1971

Inventor(s) Charles S. Hemery

It is certified that error appears in the above-identified patent and that said Letters Patent are hereby corrected as shown below:

Column 10, line 17, the words --supplied to a voltage- should be inserted before "divider".

Signed and sealed this 3rd day of August 1971.

(SEAL)
Attest:

EDWARD M. FLETCHER, JR.
Attesting Officer

WILLIAM E. SCHUYLER,
Commissioner of Paten